United States Patent
Kataoka (10) Patent No.: US 8,106,795 B2
(45) Date of Patent: Jan. 31, 2012

(54) MOBILE DEVICE

(75) Inventor: Kenji Kataoka, Tokyo (JP)

(73) Assignee: NEC Corporation, Tokyo (JP)

( * ) Notice: Subject to any disclaimer, the term of this patent is extended or adjusted under 35 U.S.C. 154(b) by 946 days.

(21) Appl. No.: 11/817,118

(22) PCT Filed: Feb. 8, 2006

(86) PCT No.: PCT/JP2006/302120
§ 371 (c)(1),
(2), (4) Date: Aug. 24, 2007

(87) PCT Pub. No.: WO2006/090584
PCT Pub. Date: Aug. 31, 2006

(65) Prior Publication Data
US 2009/0002203 A1 Jan. 1, 2009

(30) Foreign Application Priority Data

Feb. 25, 2005 (JP) .................. 2005-051598

(51) Int. Cl.
*H03K 17/94* (2006.01)
*H03M 11/00* (2006.01)
*G06F 3/033* (2006.01)
*G06F 3/02* (2006.01)
*G09G 5/08* (2006.01)
*G09G 5/00* (2006.01)

(52) U.S. Cl. ............. 341/20; 341/22; 341/24; 345/157; 345/163; 345/168

(58) Field of Classification Search .......... 345/157–163, 345/168, 173, 179; 178/18.01–18.02; 708/160–161; 715/701, 702, 856
See application file for complete search history.

(56) References Cited

U.S. PATENT DOCUMENTS

| | | | | |
|---|---|---|---|---|
| 4,812,828 | A | * 3/1989 | Nishi et al. | 345/157 |
| 5,554,980 | A | * 9/1996 | Hashimoto et al. | 345/158 |
| 6,456,952 | B1 | 9/2002 | Nathan | |
| 6,876,354 | B1 | * 4/2005 | Terasaki et al. | 345/168 |
| 2003/0214486 | A1 | 11/2003 | Roberts | |
| 2004/0017357 | A1 | * 1/2004 | Kinoshita et al. | 345/163 |

FOREIGN PATENT DOCUMENTS

| | | |
|---|---|---|
| JP | 4-113780 | 4/1992 |
| JP | 7-64694 | 3/1995 |
| JP | 7-064694 A | 3/1995 |
| JP | 7-245043 | 9/1995 |
| JP | 7-288726 | 10/1995 |
| JP | 2000-100272 | 4/2000 |
| JP | 2002-82766 | 3/2002 |
| JP | 2002-082766 A | 3/2002 |
| JP | 2003-335192 | 11/2003 |

* cited by examiner

*Primary Examiner* — Brian Zimmerman
*Assistant Examiner* — Jerold Murphy
(74) *Attorney, Agent, or Firm* — Dickstein Shapiro LLP (57) ABSTRACT

A mobile device comprises a pointing device 11 for receiving an input of a moving direction from a user, an acceleration detection unit 14 for detecting an acceleration caused by a fluctuation, and a correction unit 16 for correcting the moving direction vector inputted from the pointing device 11 by subtracting a vector on the acceleration detected by the acceleration detection unit 14 from a vector as inputted from the pointing device 11 on the moving direction. The mobile device can be ensured in mobility, even in case an abrupt fluctuation occurs at an inputting work during a movement using a transit system accompanied by fluctuations, while preventing any erroneous operation.

2 Claims, 9 Drawing Sheets

MOBILE DEVICE

FIELD OF THE INVENTION

This application is based upon and claims the benefit of the priority from Japanese patent application No. 2005-051598, filed on Feb. 25, 2005, the disclosure of which is incorporated herein in its entirety by reference.

The present invention relates to a mobile device for which mobility is important, and particularly to a mobile device capable of preventing erroneous operations.

BACKGROUND ART

In mobile devices such as mobile telephones and notebook computers for which mobility is important, the sizes of the input operation parts such as keys and pointing devices used for typing email messages, or inputting telephone numbers or scrolling while playing games are generally kept to a minimum. When a user enters data into a mobile device while using a transit system accompanied by fluctuations, such as train and bus, an abrupt shock might cause the pointing device to miss the intended target area or the user to press the wrong keys, forcing the user to re-enter the data. It is possible to prevent such erroneous operations by enlarging the idle part of the pointing device or widening the key intervals.

[Patent Document 1]
Japanese Patent Kokai Publication No. JP-P2000-100272A
[Patent Document 2]
Japanese Patent Kokai Publication No. JP-A-4-113780
[Patent Document 3]
Japanese Patent Kokai Publication No. JP-A-7-288726
[Patent Document 4]
Japanese Patent Kokai Publication No. JP-A-7-245043
[Patent Document 5]
Japanese Patent Kokai Publication No. JP-P2002-82766A
[Patent Document 6]
Japanese Patent Kokai Publication No. JP-P2003-335192A

SUMMARY OF THE DISCLOSURE

Problems to be Solved by the Invention

The disclosures of the above mentioned patent documents are incorporated herein in its entirety by reference. The following analysis is given by the present invention. However, since enlarging the idle part of the pointing device or widening the key intervals will hurt the portability of the device, it is still difficult to satisfy the both conditions.

In Patent Document 1, in order to prevent erroneous switch operations caused by vibration, means for negating a switch signal when the speed or acceleration of a vehicle is detected is disclosed. Such means is effective in the case where one can stop or slow down the car he or she is driving by his own intent, however, in the unpredictable case when the user is on a train or bus and it cannot be predicted by himself, the switch signal may be negated all the time depending on the mode of vibration, causing inconvenience, counted as a problem.

Further, means for having a camera stop capturing images when it is being dropped by detecting a slant is disclosed in Patent Documents 2 and 3, however, this means reacts to a state in which the device is used and can hardly react to small vibrations.

Further, as a key-structural solution, means for preventing the user to press the wrong keys by providing a column in the center of keys is disclosed in Patent Document 4, however, in order to effectively apply this method, a certain amount of thickness is required for the casing and the cross-sectional area of the column has to be relatively large. Therefore it is difficult to apply this method to a mobile device, in which keys are provided very closely together, since portability will suffer.

It is an object of the present invention to ensure mobility, even in the case where an abrupt fluctuation occurs at an inputting work during a movement using a transit system accompanied by fluctuations, while preventing any erroneous operation.

In a first aspect of the present invention, a mobile device comprises a pointing device that receives an input of a moving direction from a user; an acceleration detection unit that detects an acceleration caused by a fluctuation; and a correction unit that corrects a vector on a moving direction received by the pointing device by subtracting a vector on an acceleration detected by the acceleration detection unit from the vector on the moving direction received by the pointing device.

It is preferable that the mobile device of the present invention comprises a key input unit that includes a plurality of keys and that receives pressed-key information on a key pressed by a user; and a second correction unit that corrects the pressed-key information received by the key input unit by subtracting a vector on an acceleration detected by the acceleration detection unit from the center coordinate of a key actually pressed in the key input unit.

In a second aspect of the present invention, a mobile device comprises a key input unit that comprises a plurality of keys and that receives pressed-key information on a key pressed by a user; an acceleration detection unit that detects an acceleration caused by a fluctuation; and a correction unit that corrects the pressed-key information received by the key input unit by subtracting a vector on an acceleration detected by the acceleration detection unit from the center coordinate of a key actually pressed in the key input unit.

The meritorious effects of the present invention are summarized as follows.

According to the present invention, even when a user enters data into a mobile device while using a transit system accompanied by fluctuations, the user can perform the same input operation as if when there is no fluctuation.

EXPLANATIONS OF SYMBOLS

10: input operation part
11: pointing device
11a: X-axis sensor
11b: Y-axis sensor
12: input voltage level conversion unit
13: reference voltage output unit
14: acceleration detection unit
14a: X-axis acceleration sensor
14b: Y-axis acceleration sensor
15: acceleration inverted voltage level conversion unit
16: input voltage level correction unit (correction unit)
17: corrected movement amount (displacement) conversion unit
18: input processing unit
20: input operation part
21: key input unit
22: coordinate voltage level conversion unit
24: acceleration detection unit
24a: X-axis acceleration sensor
24b: Y-axis acceleration sensor
25: acceleration inverted voltage level conversion unit
26: coordinate voltage level correction unit (correction unit)
27: corrected pressed-key information conversion unit
28: input processing unit

PREFERRED MODES FOR CARRYING OUT THE INVENTION

Example 1

Figure 1:
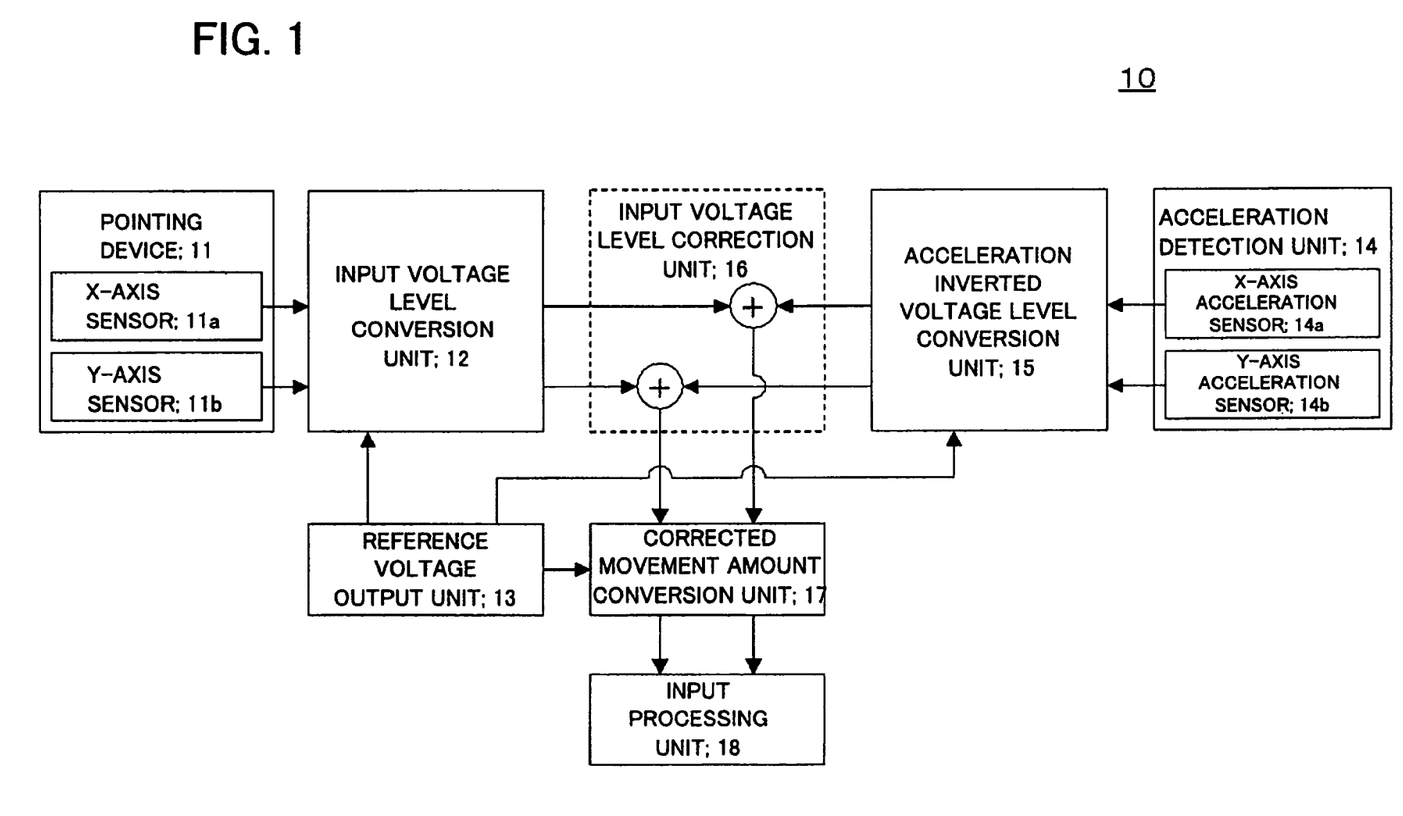
FIG. 1 is a block diagram schematically showing the configuration of an input operation part of a mobile device relating to Example 1 of the present invention.

A mobile device relating to Example 1 of the present invention will be described with reference to the drawings. FIG. 1 is a block diagram schematically showing the configuration of an input operation part of a mobile device relating to Example 1 of the present invention.

The input operation part 10 is an electronic device having a pointing device 11 as a main part, and is built into the mobile device (not shown in the drawing). The input operation part 10 comprises the pointing device 11, an input voltage level conversion unit 12, a reference voltage output unit 13, an input voltage level correction unit 16, an acceleration detection unit 14, an acceleration inverted voltage level conversion unit 15, a corrected displacement (movement amount) conversion unit 17, and an input processing unit 18.

The pointing device 11 is a device that receives an input of a moving direction from a user and is electrically connected to the input voltage level conversion unit 12. For instance, a device comprising a button (or lever) with which an input operation can be performed in a 360-degree angle may be used as the pointing device 11. The pointing device 11 comprises an X-axis sensor 11a that detects a motion in the X-axis direction and a Y-axis sensor 11b that detects a motion in the Y-axis direction. The pointing device 11 derives the amount of movement (displacement) in the X-axis direction according to X-axis movement data on a motion in the X-axis direction received from the X-axis sensor 11a, and outputs X-axis movement amount data on the amount of movement in the X-axis direction to the input voltage level conversion unit 12. Similarly, the pointing device 11 derives the amount of movement (displacement) in the Y-axis direction according to Y-axis movement data on a motion in the Y-axis direction received from the Y-axis sensor 11b, and outputs Y-axis movement amount data on the amount of movement in the Y-axis direction to the input voltage level conversion unit 12. Note that the pointing device 11 does not derive the amount of any movement nor output any movement amount data when no motion in the X or Y-axis direction is detected.

The input voltage level conversion unit 12 converts the movement amount data (the X-axis movement amount data and the Y-axis movement amount data) received from the pointing device 11 into input voltage levels, and is electrically connected to the pointing device 11, the input voltage level correction unit 16, and the reference voltage output unit 13. Here, the input voltage level corresponds to the movement amount data received. When the input voltage level conversion unit 12 receives the X-axis movement amount data and the Y-axis movement amount data from the pointing device 11, an offset voltage level from the reference voltage output unit 13 is respectively added to the X-axis movement amount data and the Y-axis movement amount data, which are converted into an X-axis input voltage level and a Y-axis input voltage level in a positive direction which is determined based on the direction of the offset voltage level. The X-axis input voltage level and the Y-axis input voltage level are outputted to the input voltage level correction unit 16. Note that the input voltage level conversion unit 12 does not perform the addition of the offset voltage level, the conversion into the input voltage levels, and the output of the input voltage levels when it does not receive the movement amount data from the pointing device 11.

The reference voltage output unit 13 respectively supplies the offset voltage level used for correcting the movement amount to the input voltage level conversion unit 12, the acceleration inverted voltage level conversion unit 15, and the corrected movement amount conversion unit 17, and is electrically connected to the input voltage level conversion unit 12, the acceleration inverted voltage level conversion unit 15, and the corrected movement amount conversion unit 17. Here, the offset voltage level means a voltage level added to an input voltage level or an acceleration inverted voltage level in order to express the input voltage level or the acceleration inverted voltage level in terms of a difference from the reference voltage level, and a voltage level subtracted from a corrected input voltage level in order to express the corrected input voltage level in terms of a difference from the reference voltage level.

The acceleration detection unit 14 detects the fluctuation (vibration or swing) of the mobile device (not shown in the drawing) as an acceleration and is electrically connected to the acceleration inverted voltage level conversion unit 15. The acceleration detection unit 14 comprises an X-axis acceleration sensor 14a that detects an acceleration in the X-axis direction and a Y-axis acceleration sensor 14b that detects an acceleration in the Y-axis direction. The acceleration detection unit 14 outputs the X-axis acceleration data detected by the X-axis acceleration sensor 14a to the acceleration inverted voltage level conversion unit 15. Similarly, the acceleration detection unit 14 outputs the Y-axis acceleration data detected by the Y-axis acceleration sensor 14b to the acceleration inverted voltage level conversion unit 15. Note that the acceleration detection unit 14 does not output any acceleration data when neither the X-axis acceleration sensor 14a nor the Y-axis acceleration sensor 14b detects any acceleration.

The acceleration inverted voltage level conversion unit 15 converts the acceleration data received from the acceleration detection unit 14 into acceleration inverted voltage levels, and is electrically connected to the acceleration detection unit 14, the input voltage level correction unit 16, and the reference voltage output unit 13. When the acceleration inverted voltage level conversion unit 15 receives the X-axis acceleration data and the Y-axis acceleration data from the acceleration detection unit 14, an offset voltage level is respectively added to the X-axis acceleration data and the Y-axis acceleration data according to a reference voltage from the reference voltage output unit 13, the data are converted into an X-axis acceleration inverted voltage level and a Y-axis acceleration inverted voltage level in an inverse direction based on the offset voltage level, and the X-axis acceleration inverted voltage level and the Y-axis acceleration inverted voltage level are outputted to the input voltage level correction unit 16. Note that the acceleration inverted voltage level conversion unit 15 does not perform the addition of the offset voltage level, the conversion into the acceleration inverted voltage levels, and the output of the acceleration inverted voltage levels when it does not receive the acceleration data from the acceleration detection unit 14.

The input voltage level correction unit 16 converts the input voltage levels received from the input voltage level conversion unit 12 into corrected input voltage levels according to the acceleration inverted voltage level(s) from the acceleration inverted voltage level conversion unit 15, and is electrically connected to the input voltage level conversion unit 12, the acceleration inverted voltage level conversion unit 15, and the corrected movement amount conversion unit 17. The input voltage level correction unit 16 receives the X-axis input voltage level from the input voltage level conversion unit 12 and the X-axis acceleration inverted voltage level from the acceleration inverted voltage level conversion unit 15, converts the X-axis input voltage level into an X-axis corrected input voltage level, which is a corrected value of the X-axis input voltage level, by adding the X-axis input voltage level and the X-axis acceleration inverted voltage level, and outputs the X-axis corrected input voltage level to the corrected movement amount conversion unit 17. Similarly, the input voltage level correction unit 16 receives the Y-axis input voltage level from the input voltage level conversion unit 12 and the Y-axis acceleration inverted voltage level from the acceleration inverted voltage level conversion unit 15, converts the Y-axis input voltage level into a Y-axis corrected input voltage level, which is a corrected value of the Y-axis input voltage level, by adding the Y-axis input voltage level and the Y-axis acceleration inverted voltage level, and outputs the Y-axis corrected input voltage level to the corrected movement amount conversion unit 17. Note that the input voltage level correction unit 16 does not perform the correction and outputs the input voltage level received from the input voltage level conversion unit 12 as the corrected input voltage level to the corrected movement amount conversion unit 17 when it does not receive any acceleration inverted voltage level and receives only the input voltage level.

The corrected movement amount conversion unit 17 converts the corrected input voltage levels received from the input voltage level correction unit 16 into corrected movement data and is electrically connected to the input voltage level correction unit 16, the input processing unit 18, and the reference voltage output unit 13. The corrected movement amount conversion unit 17 respectively subtracts an offset voltage level from the X-axis corrected input voltage level and the Y-axis corrected input voltage level received from the input voltage level correction unit 16 based on a reference voltage(s) from the reference voltage output unit 13, converts these corrected input voltage levels into X-axis corrected movement amount data and Y-axis corrected movement amount data, and outputs the X-axis corrected movement amount data and Y-axis corrected movement amount data to the input processing unit 18.

The input processing unit 18 performs the input processing of the corrected movement amount data and is electrically connected to the corrected movement amount conversion unit 17. The input processing unit 18 performs the input processing of the corrected movement amount data received from the corrected movement amount conversion unit 17.

Figure 2:
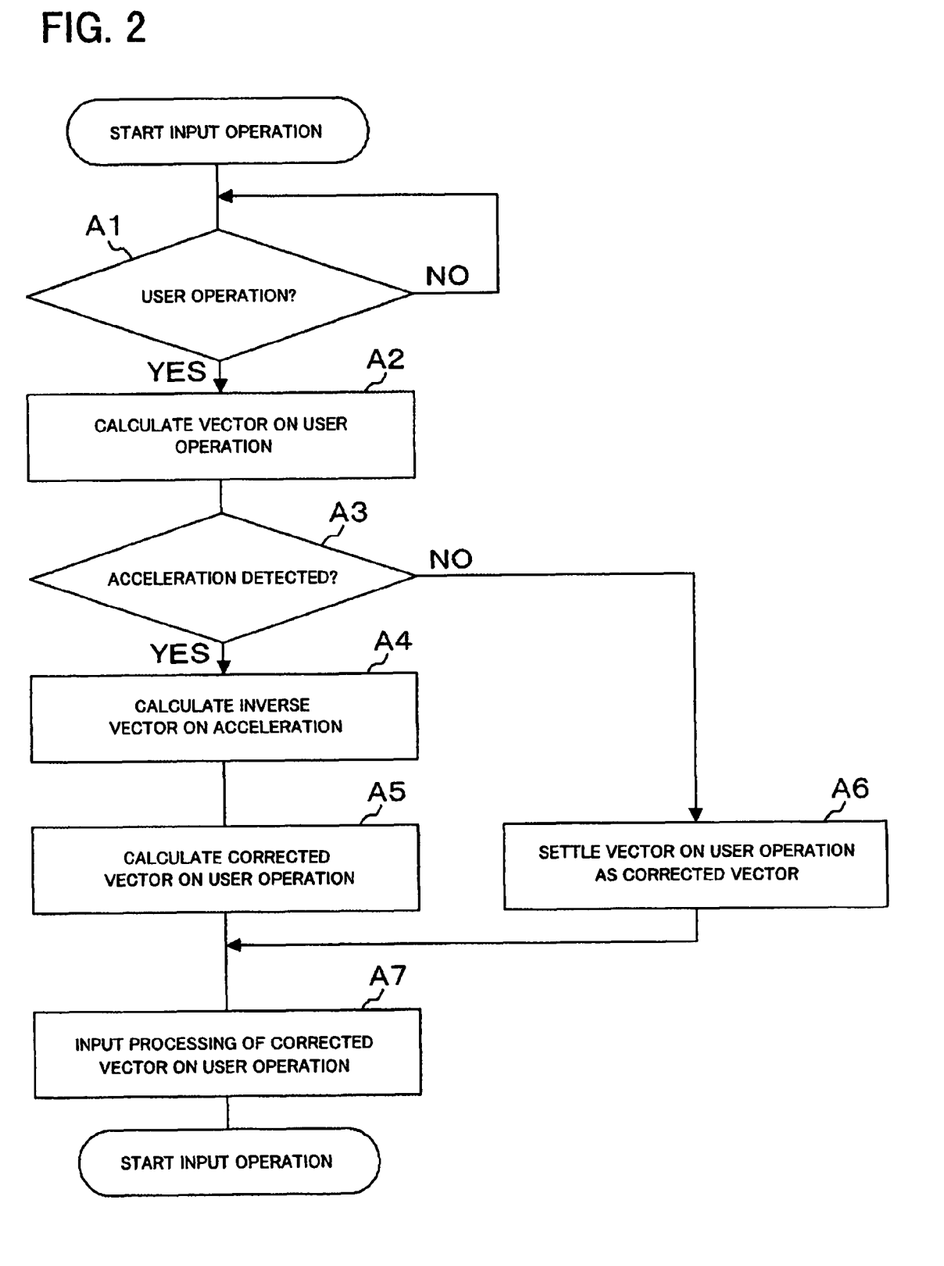
FIG. 2 is a flowchart schematically showing the operation of the input operation part of the mobile device relating to Example 1 of the present invention.
Figure 3:
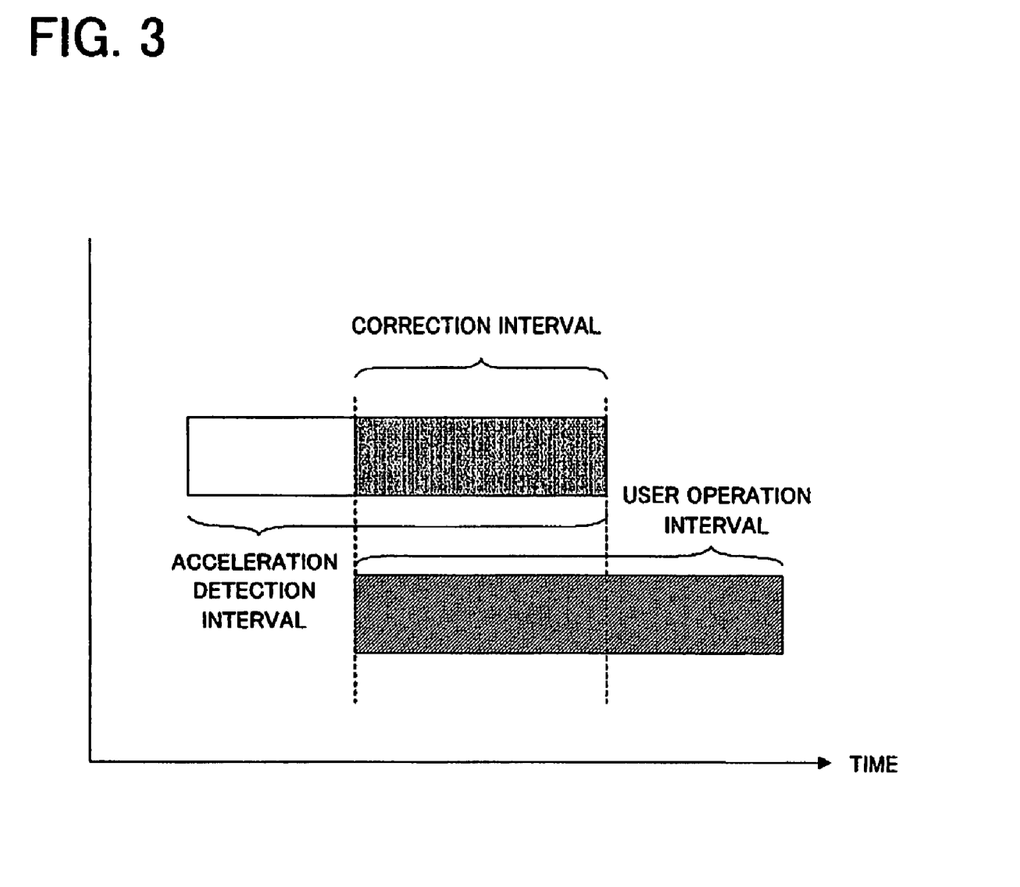
FIG. 3 is an image diagram for explaining a correction interval during an input operation of the mobile device relating to Example 1 of the present invention.

Next, the operation of the input operation part of the mobile device relating to Example 1 will be described with reference to the drawings. FIG. 2 is a flowchart schematically showing the operation of the input operation part of the mobile device relating to Example 1 of the present invention. FIG. 3 is an image diagram for explaining a correction interval during an input operation of the mobile device relating to Example 1 of the present invention. In regard to the constituent units 11 to 18 of the input operation part, refer to FIG. 1.

First, once an input operation starts, whether or not there is a user operation is confirmed (step A1). This confirmation of a user operation is determined by whether or not a movement (displacement) of the X-axis sensor 11a and the Y-axis sensor 11b of the pointing device 11 by the user is detected. When there is no user operation (NO in step A1), the step A1 is repeated.

When a user operation (manipulation) is detected (YES in the step A1), a vector on the user operation is calculated (step A2). This calculation of the vector is performed by first deriving the movement amount data (the X-axis movement amount data and the Y-axis movement amount data) according to the movement data (the X-axis movement data and the Y-axis movement data) on the movement received from the X-axis sensor 11a and the Y-axis sensor 11b of the pointing device 11 and having the input voltage level conversion unit 12 convert the movement amount data into the input voltage levels.

After the step A2, whether or not an acceleration caused by a fluctuation is simultaneously detected along with the user operation is determined (step A3). This detection of an acceleration is performed by determining whether or not an acceleration is detected by the X-axis acceleration sensor 14a and the Y-axis acceleration sensor 14b of the acceleration detection unit 14.

When an acceleration is detected (YES in step A3), an inverse vector is calculated from the vector on the acceleration (step A4). This calculation of the inverse vector is performed by having the acceleration inverted voltage level conversion unit 15 convert the acceleration data (the X-axis acceleration data and the Y-axis acceleration data) received from the acceleration detection unit 14 into the acceleration inverted voltage levels (the X-axis acceleration inverted voltage level and the Y-axis acceleration inverted voltage level).

After the step A4, a corrected vector (the intended vector), which is a correction of the vector on the user operation when there is no fluctuation, is calculated by adding the vector on the user operation and the inverse vector on the acceleration (step A5). This calculation of the corrected vector is performed by having the input voltage level correction unit 16 add the input voltage levels (the X-axis input voltage level and the Y-axis input voltage level) from the input voltage level conversion unit 12 to the acceleration inverted voltage levels (the X-axis acceleration inverted voltage level and the Y-axis acceleration inverted voltage level from the acceleration inverted voltage level conversion unit 15 and convert the input voltage levels into the corrected input voltage levels (the X-axis corrected input voltage level and the Y-axis corrected input voltage level) that are corrected values of the input voltage levels, and having the corrected movement amount conversion unit 17 convert the corrected input voltage levels from the input voltage level correction unit 16 into the corrected movement amount data (the X-axis corrected movement amount data and the Y-axis corrected movement amount data). Here, in terms of a time interval in which the vector on the user operation is corrected, only an interval where a user operation interval and an acceleration detection interval temporally overlap becomes the target of the correction (refer to FIG. 3).

When no acceleration is detected (NO in step A3), the vector on the user operation is confirmed to be the corrected vector (step A6). This confirmation of the corrected vector on the user operation is performed by having the input voltage level correction unit 16 determine that the input voltage levels (the X-axis input voltage level and the Y-axis input voltage level) from the input voltage level conversion unit 12 are the corrected input voltage levels (the X-axis corrected input voltage level and the Y-axis corrected input voltage level), and having the corrected movement amount conversion unit 17 convert the corrected input voltage levels from the input voltage level correction unit 16 into the corrected movement amount data (the X-axis corrected movement amount data and the Y-axis corrected movement amount data). Here, in terms of a time interval in which the vector on the user operation is determined to be the corrected vector, only a part of the user operation interval that does not temporally overlap with the acceleration detection interval is taken into consideration (refer to FIG. 3).

After the step A5 or A6, the input processing of the corrected vector on the user operation is performed (step A7). This input processing of the corrected vector is performed by the input processing unit 18 according to the corrected movement amount data (the X-axis corrected movement amount data and the Y-axis corrected amount movement data) from the corrected movement amount conversion unit 17. This completes the input operation.

Figure 4:
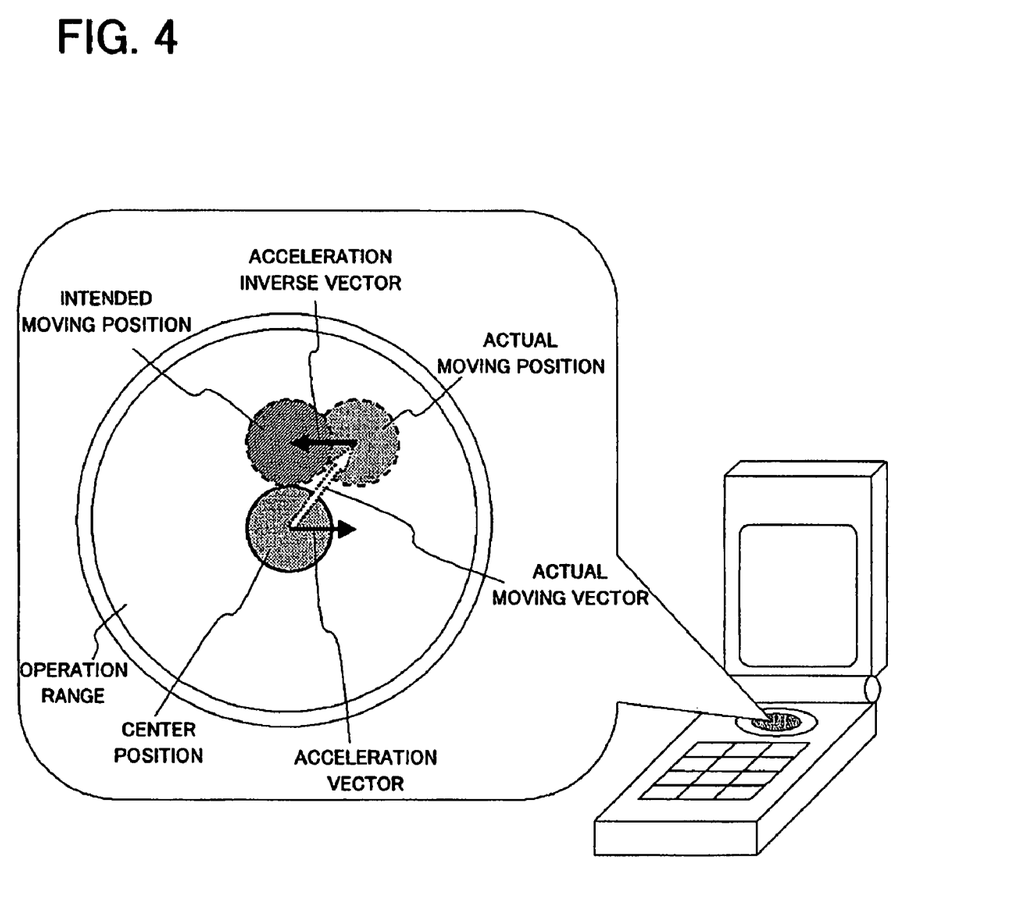
FIG. 4 is an image diagram for explaining the operation of the mobile device relating to Example 1 of the present invention when it receives a fluctuation while being viewed from the outside.

Next, the operation of the mobile device relating to Example 1 when it receives a fluctuation while being viewed from the outside will be described with reference to the drawings. FIG. 4 is an image diagram for explaining the operation of the mobile device relating to Example 1 of the present invention when it receives a fluctuation while being viewed from the outside. This mobile device is a mobile telephone comprising a pointing device. The pointing device comprises a button (or lever) with which an input operation can be performed in a 360-degree angle. When the user operates and moves the button (or lever) from a "center position" (an initial state) of an "operation range" of the pointing device to an "actual moving position" while the device receives a fluctuation, an "acceleration inverse vector," which is the inverse vector of an acceleration vector during the operation, is added to the "actual moving position" as a correction, therefore the "actual moving position" is converted into input information that indicates an "intended moving position."

According to Example 1, even when there is a fluctuation during the input operation of a mobile device, the same input result as when there is no fluctuation can be obtained by detecting the direction and the movement amount of the fluctuation as a vector, and correcting the movement amount vector against the influence of the fluctuation in a such direction as to negate the vector on the direction of the fluctuation.

Example 2

Figure 5:
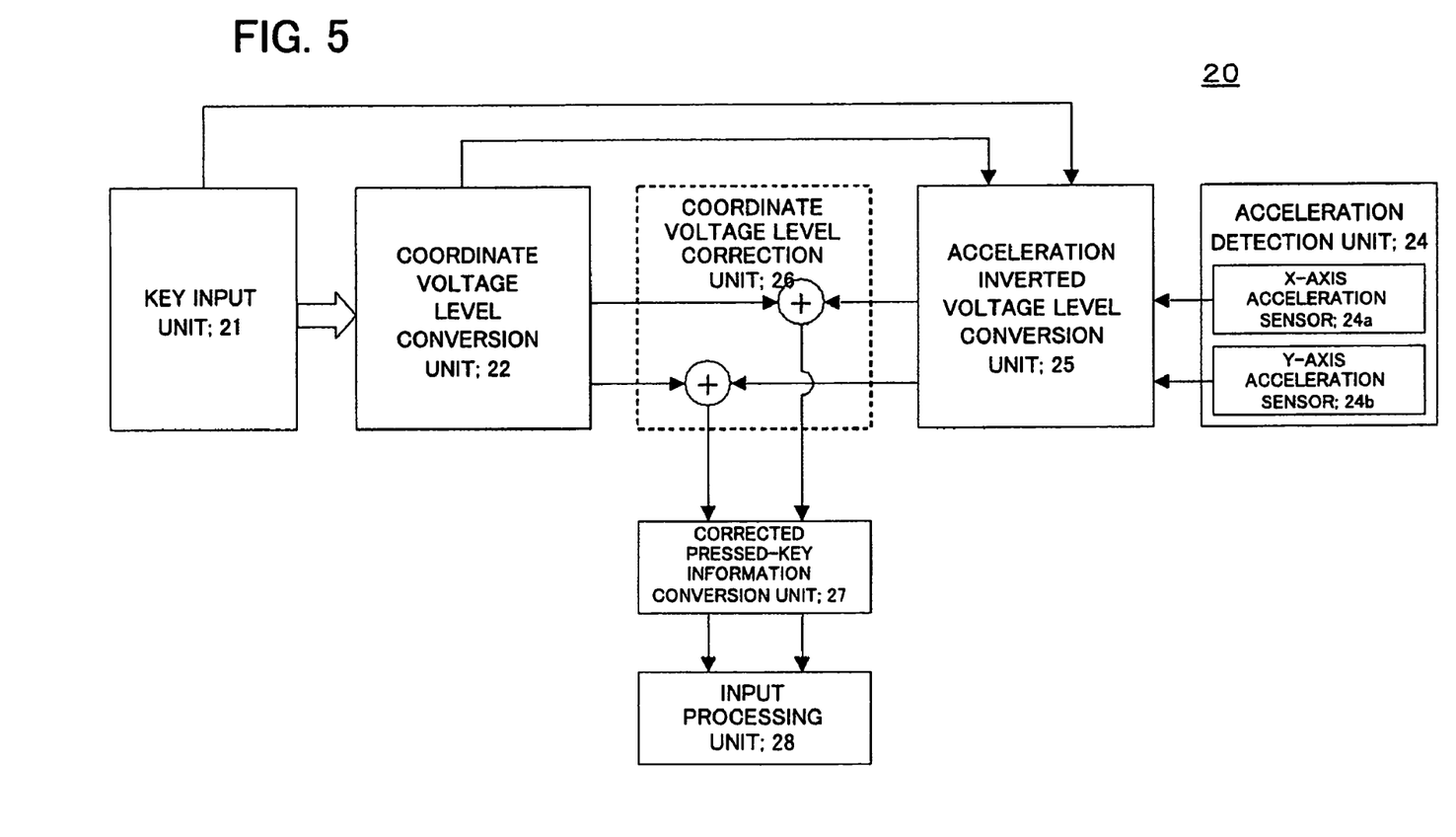
FIG. 5 is a block diagram schematically showing the configuration of an input operation part of the mobile device relating to Example 2 of the present invention.
Figure 6:
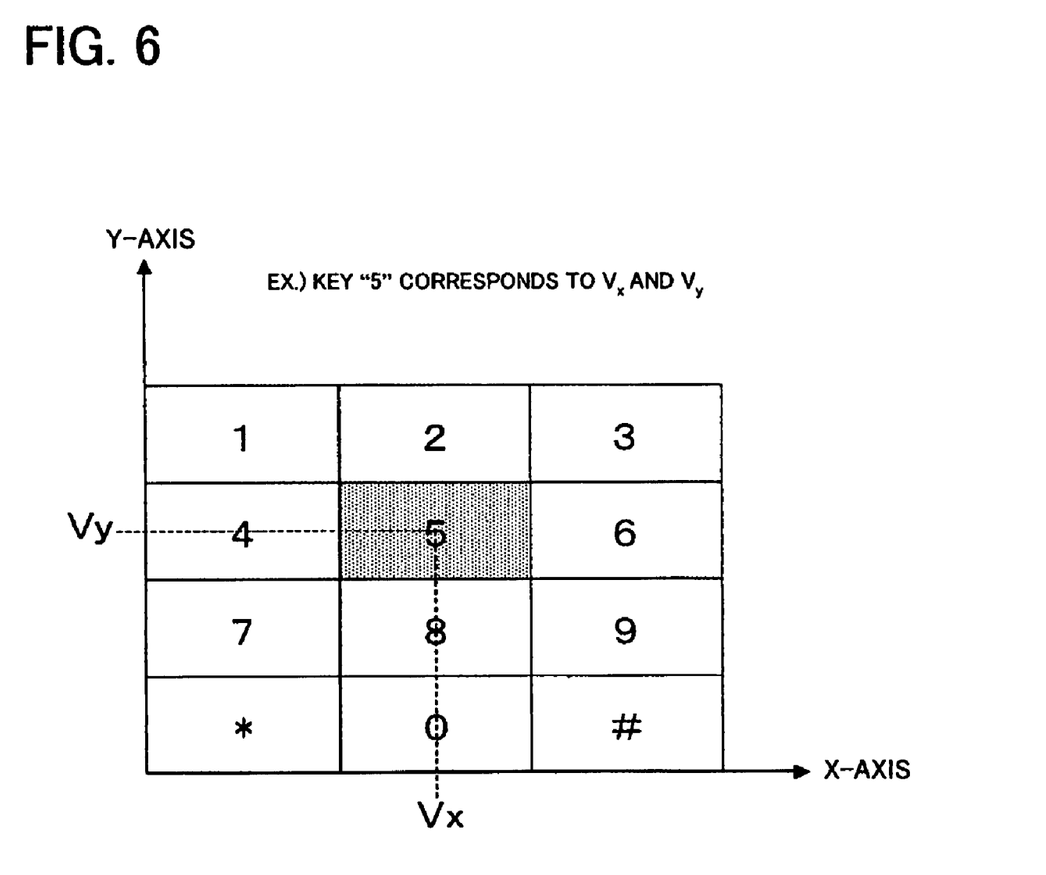
FIG. 6 is an image diagram schematically showing an example in which pressed-key information is converted by a coordinate voltage level conversion unit of the mobile device relating to Example 2 of the present invention.

A mobile device relating to Example 2 of the present invention will be described with reference to the drawings. FIG. 5 is a block diagram schematically showing the configuration of an input operation part (or unit) of the mobile device relating to Example 2 of the present invention. FIG. 6 is an image diagram schematically showing an example in which pressed-key information is converted by a coordinate voltage level conversion unit of the mobile device relating to Example 2 of the present invention.

An input operation part 20 is an electronic device having a key input unit 21 as a main part, and is built into the mobile device (not shown in the drawing). The input operation part 20 comprises a key input unit 21, a coordinate voltage level conversion unit 22, an acceleration detection unit 24, an acceleration inverted voltage level conversion unit 25, a coordinate voltage level correction unit 26, a corrected pressed-key information conversion unit 27, and an input processing unit 28. Note that the acceleration detection unit 24 is the same as the acceleration detection unit 14 of Example 1 (refer to FIG. 1).

The key input unit 21 has a plurality of keys and receives pressed-key information relating to keys pressed by the user, and is electrically connected to the coordinate voltage level conversion unit 22 and the acceleration inverted voltage level conversion unit 25. For instance, a device comprising a numeric keypad where a plurality of keys is provided adjacent to each other can be used as the key input unit 21. The key input unit 21 outputs the pressed-key information relating to keys pressed by the user to the coordinate voltage level conversion unit 22. Further, the key input unit 21 outputs pressed-key detection information that indicates some pressed keys are detected to the acceleration inverted voltage level conversion unit 25 when it detects pressed keys. Note that the key input unit 21 does not output any pressed-key information or pressed-key detection information when it does not detect any pressed key.

The coordinate voltage level conversion unit 22 converts the pressed-key information received from the key input unit 21 into coordinate voltage levels, and is electrically connected to the key input unit 21, the acceleration inverted voltage level conversion unit 25, and the coordinate voltage level correction unit 26. Here, the coordinate voltage level means X-axis and Y-axis voltage levels that correspond to center coordinates of pressed keys. For instance, when a key "5" is pressed in the key input unit 21, the coordinate voltage level conversion unit 22 converts the pressed-key information relating to "5" into an X-axis coordinate voltage level $V_x$ and an Y-axis coordinate voltage level $V_y$ that correspond to the center coordinate of the key "5" (refer to FIG. 6). The coordinate voltage level conversion unit 22 converts the pressed-key information received from the key input unit 21 into the X-axis coordinate voltage level and the Y-axis coordinate voltage level that correspond to a center coordinate of the key relating to the received pressed-key information, and outputs the X-axis coordinate voltage level and the Y-axis coordinate voltage level to the acceleration inverted voltage level conversion unit 25 and the coordinate voltage level conversion unit 26. Note that the coordinate voltage level conversion unit 22 does not perform the conversion into and the output of the X-axis coordinate voltage level and the Y-axis coordinate voltage level when it does not receive any pressed-key information from the key input unit 21.

The acceleration inverted voltage level conversion unit 25 converts acceleration data received from the acceleration detection unit into acceleration inverted voltage levels, and is electrically connected to the key input unit 21, the coordinate voltage level conversion unit 22, the acceleration detection unit 24, and the coordinate voltage level correction unit 26. The acceleration inverted voltage level conversion unit 25 holds X-axis acceleration data and Y-axis acceleration data for a predetermined period of time by receiving the X-axis acceleration data and the Y-axis acceleration data from the acceleration detection unit 24. When the acceleration inverted voltage level conversion unit 25 receives the pressed-key detection information from the key input unit 21 and holds the X-axis acceleration data and the Y-axis acceleration data on a point of time immediately before it receives the pressed-key detection information, the acceleration inverted voltage level conversion unit 25 respectively adds an offset voltage level to the X-axis acceleration data and the Y-axis acceleration data according to the X-axis coordinate voltage level and the Y-axis coordinate voltage level from the coordinate voltage level conversion unit 22, converts the X-axis acceleration data and the Y-axis acceleration data into an X-axis acceleration inverted voltage level and a Y-axis acceleration inverted voltage level in an inverse direction determined based on the offset voltage level, and outputs the X-axis acceleration inverted voltage level and the Y-axis acceleration inverted voltage level to the coordinate voltage level correction unit 26. Note that the acceleration inverted voltage level conversion unit 25 does not perform the addition of the offset voltage level, the conversion into the acceleration inverted voltage levels, and the output of the acceleration inverted voltage levels when (1) it does not receive any X-axis acceleration data or Y-axis acceleration data from the acceleration detection unit 24, (2) a predetermined period of time has lapsed for the held X-axis acceleration data and the Y-axis acceleration data from the acceleration detection unit 24, and (3) it does not receive any pressed-key detection information from the key input unit 21.

The coordinate voltage level correction unit 26 converts the coordinate voltage levels from the coordinate voltage level conversion unit 22 into corrected coordinate voltage levels according to the acceleration inverted voltage levels from the acceleration inverted voltage level conversion unit 25, and is electrically connected to the coordinate voltage level conversion unit 22, the acceleration inverted voltage level conversion unit 25, and the corrected pressed-key information conversion unit 27. The coordinate voltage level correction unit 26 receives the X-axis coordinate voltage level from the coordinate voltage level conversion unit 22 and the X-axis acceleration inverted voltage level from the acceleration inverted voltage level conversion unit 25, converts the X-axis coordinate voltage level into an X-axis corrected coordinate voltage level, which is a corrected value of the X-axis coordinate voltage level, by adding the X-axis coordinate voltage level and the X-axis acceleration inverted voltage level, and outputs the X-axis corrected coordinate voltage level to the corrected pressed-key information conversion unit 27. Similarly, the coordinate voltage level correction unit 26 receives the Y-axis coordinate voltage level from the coordinate voltage level conversion unit 22 and the Y-axis acceleration inverted voltage level from the acceleration inverted voltage level conversion unit 25, converts the Y-axis coordinate voltage level into an Y-axis corrected coordinate voltage level, which is a corrected value of the Y-axis coordinate voltage level, by adding the Y-axis coordinate voltage level and the Y-axis acceleration inverted voltage level, and outputs the Y-axis corrected coordinate voltage level to the corrected pressed-key information conversion unit 27. Note that the coordinate voltage level correction unit 26 outputs the coordinate voltage levels received from the coordinate voltage level conversion unit 22 to the corrected pressed-key information conversion unit 27 as a corrected coordinate voltage level without performing the correction when it receives only the coordinate voltage levels and no acceleration inverted voltage level.

The corrected pressed-key information conversion unit 27 converts the corrected coordinate voltage levels from the coordinate voltage level correction unit 26 into corrected pressed-key information, and is electrically connected to the coordinate voltage level correction unit 26 and the input processing unit 28. The corrected pressed-key information conversion unit 27 stores a map that defines the range of the X-axis corrected coordinate voltage levels and the Y-axis corrected coordinate voltage levels corresponding to each pressed-key information (a range that corresponds to the region of each key). Referring to the map, the corrected pressed-key information conversion unit 27 converts the X-axis corrected coordinate voltage level and the Y-axis corrected coordinate voltage level received from the coordinate voltage level correction unit 26 into the corrected pressed-key information, and outputs this corrected pressed-key information to the input processing unit 28. Note that there are some cases where the corrected pressed-key information is the same as the pressed-key information from the key input unit 21.

The input processing unit 28 performs the input processing of the corrected pressed-key information, and is electrically connected to the corrected pressed-key information conversion unit 27. The input processing unit 28 performs the input processing of the corrected pressed-key information received from the corrected pressed-key information conversion unit 27.

Figure 7:
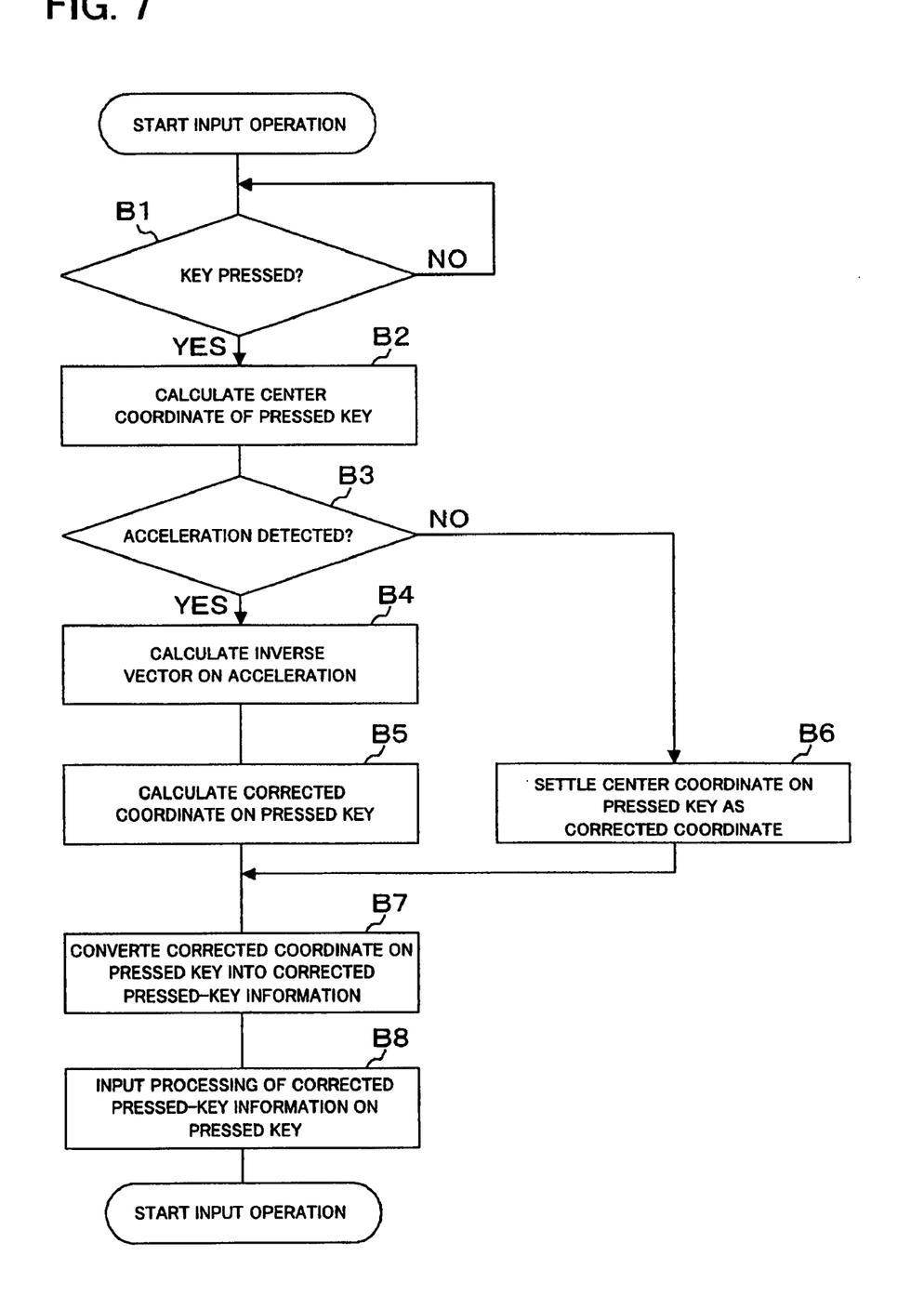
FIG. 7 is a flowchart schematically showing the operation of the input operation part of the mobile device relating to Example 2 of the present invention.
Figure 8:
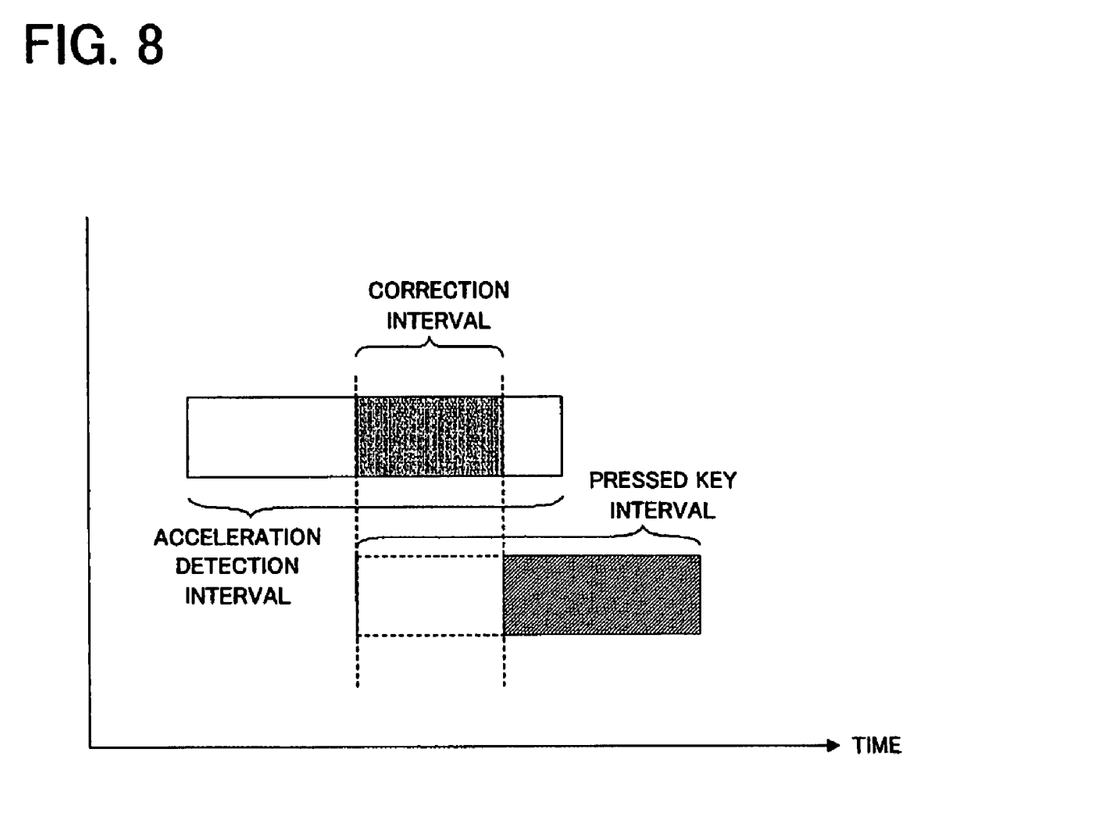
FIG. 8 is an image diagram for explaining a correction interval during an input operation of the mobile device relating to Example 2 of the present invention.

Next, the operation of the input operation part of the mobile device relating to Example 2 will be described with reference to the drawings. FIG. 7 is a flowchart schematically showing the operation of the input operation part of the mobile device relating to Example 2 of the present invention. FIG. 8 is an image diagram for explaining a correction interval during an input operation of the mobile device relating to Example 2 of the present invention. In regard to the constituent units 21 to 28 of the input operation part, refer to FIG. 5.

First, once an input operation starts, whether or not a key is pressed is confirmed (step B1). This confirmation of a pressed key is determined by whether or not the key input unit 21 detects a key pressed by the user. When there is no pressed key (NO in step B1), the step B1 is repeated.

When there is a pressed key (YES in step B1), the center coordinate of the pressed key is calculated (step B2). This calculation of the center coordinate is performed by having the coordinate voltage level conversion unit 22 convert the pressed-key information from the key input unit 21 into the coordinate voltage levels.

After the step B2, whether or not any acceleration caused by a fluctuation is detected immediately before the user pressed the key is confirmed (step B3). This detection of an acceleration is performed by having the acceleration inverted voltage level conversion unit 25 receive the pressed-key detection information from the key input unit 21 and is determined by whether or not the acceleration inverted voltage level conversion unit 25 holds the X-axis acceleration data and the Y-axis acceleration data relating to a point of time immediately before it receives this pressed-key detection information.

When the acceleration immediately before the pressing of the key is detected (YES in step B3), an inverse vector is calculated from a vector on the acceleration immediately before the pressing of the key (step B4). This calculation of the inverse vector is performed by having the acceleration inverted voltage level conversion unit 25 receive the pressed-key detection information from the key input unit 21 and convert the acceleration data (the X-axis acceleration data and the Y-axis acceleration data), received from the acceleration detection unit 24 immediately before receiving this pressed-key detection information, into the acceleration inverted voltage levels (the X-axis acceleration inverted voltage level and the Y-axis acceleration inverted voltage level).

After the step B4, a corrected coordinate (the intended coordinate), which is a correction of the coordinate relating to the pressed key when there is no fluctuation, is calculated by adding the inverse vector on the acceleration immediately before the pressing of the key to the center coordinate relating to the pressed key (step B5). This calculation of the corrected coordinate is performed by having the coordinate voltage level correction unit 26 add the coordinate voltage levels (the X-axis coordinate voltage level and the Y-axis coordinate voltage levels) from the coordinate voltage level conversion unit 22 and the acceleration inverted voltage levels (the X-axis acceleration inverted voltage level and the Y-axis acceleration inverted voltage level) from the acceleration inverted voltage level conversion unit 25 and convert the coordinate voltage levels into the corrected coordinate voltage levels (the X-axis corrected coordinate voltage level and the Y-axis corrected coordinate voltage level), which are corrected value of the coordinate voltage levels. Here, in terms of a time interval in which the pressed-key information is corrected, only an interval where the user operation interval (i.e., pressed-key interval) and the acceleration detection interval temporally overlap becomes the target of the correction (refer to FIG. 8).

When no acceleration immediately before the pressing of the key is detected (NO in the step B3), the center coordinate relating to the pressed key is settled (determined) to be the corrected coordinate (step B6). This confirmation of the corrected coordinate relating to the pressed key is performed by having the coordinate voltage level correction unit 26 determine that the coordinate voltage levels (the X-axis coordinate voltage level and the Y-axis coordinate voltage level) from the coordinate voltage level conversion unit 22 are the corrected coordinate voltage levels (the X-axis corrected coordinate voltage level and the Y-axis corrected coordinate voltage level). Here, in terms of a time interval in which the pressed-key information on the pressed key is determined to be the corrected pressed-key information, only a part of the pressed-key interval that does not temporally overlap with the acceleration detection interval is taken into consideration (refer to FIG. 8).

After the step B5 or B6, the corrected coordinate relating to the pressed key is converted into the corrected pressed-key information (step B7). This conversion into the corrected pressed-key information is performed by having the corrected pressed-key information conversion unit 27 convert the corrected coordinate voltage levels from the coordinate voltage level correction unit 26 into the corrected pressed-key information.

After the step B7, the input processing of the corrected pressed-key information relating to the pressed key is performed (step B8). This input processing of the corrected pressed-key information is performed by the input processing unit 28 according to the corrected pressed-key information from the corrected pressed-key information conversion unit 27. This completes the input operation.

Figure 9:
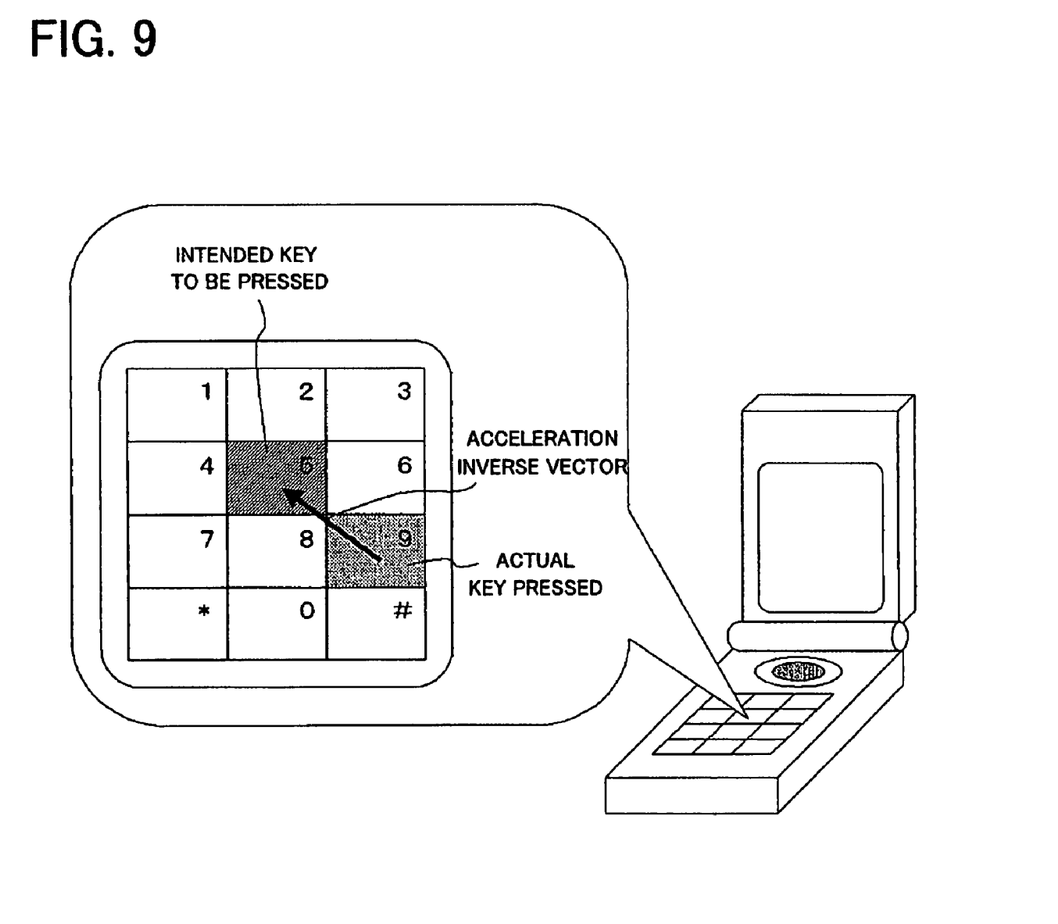
FIG. 9 is an image diagram for explaining the operation of the mobile device relating to Example 2 of the present invention when it receives a fluctuation while being viewed from the outside.

Next, the operation of the mobile device relating to Example 2 when it receives a fluctuation while being viewed from the outside will be described with reference to the drawings. FIG. 9 is an image diagram for explaining the operation of the mobile device relating to Example 2 of the present invention when it receives a fluctuation while being viewed from the outside. This mobile device is a mobile telephone comprising a numeric keypad where a plurality of keys is provided adjacent to each other. When a "9" key is pressed while the device is receiving a fluctuation, an "acceleration inverse vector," which is an inverse vector of an acceleration vector during a time period when the key is pressed, is added to the "actual key pressed" as a correction. As a result, a key "5" in a moving position of an "intended key pressed" becomes the input information.

According to Example 2, during an input operation of the mobile device, even when there is a fluctuation while a key is being pressed, the same input result as when there is no fluctuation can be obtained by detecting the direction of the fluctuation as a vector, and correcting the pressed key against the influence of the fluctuation so that the vector on the direction of the fluctuation is negated.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A mobile device comprising:
a key input unit that comprises a plurality of keys and that receives pressed-key information on a key pressed by a user;
a coordinate voltage level conversion unit that converts the pressed-key information received from the key input unit into a coordinate voltage level;
an acceleration detection unit that detects an acceleration caused by a fluctuation;
an acceleration inverted voltage level conversion unit that holds acceleration data for a predetermined period of time by receiving the acceleration data from the acceleration detection unit and, when the acceleration inverted voltage level conversion unit receives the pressed-key detection information from the key input unit and holds acceleration data on a point of time immediately before receiving the pressed-key detection information, adds an offset voltage level to the acceleration data according to the coordinate voltage level from the coordinate voltage level conversion unit and converts the acceleration data into an acceleration inverted voltage level in an inverse direction determined based on the offset voltage level;
a coordinate voltage level correction unit that converts the coordinate voltage level from the coordinate voltage level conversion unit into a corrected coordinate voltage level according to the acceleration inverted voltage level from the acceleration inverted voltage level conversion unit; and
a corrected pressed-key information conversion unit that converts the corrected coordinate voltage level from the coordinate voltage level correction unit into corrected pressed-key information.

2. A mobile device comprising:
a reference voltage output unit that outputs a reference voltage;
a pointing device that receives an input of a moving direction from a user;
an input voltage level conversion unit that adds an offset voltage level from the reference voltage output unit to movement amount data from the pointing device and converts the movement amount data into an input voltage level in a positive direction which is determined based on a direction of the offset voltage level;

a key input unit that comprises a plurality of keys and that receives pressed-key information on a key pressed by a user;

a coordinate voltage level conversion unit that converts the pressed-key information received from the key input unit into a coordinate voltage level;

an acceleration detection unit that detects an acceleration caused by a fluctuation;

a first acceleration inverted voltage level conversion unit that adds to acceleration data from the acceleration detection unit an offset voltage level according to the reference voltage from the reference voltage output unit and converts the acceleration data into an acceleration inverted voltage level in an inverse direction based on the offset voltage level;

a second acceleration inverted voltage level conversion unit that holds acceleration data for a predetermined period of time by receiving the acceleration data from the acceleration detection unit and, when the acceleration inverted voltage level conversion unit receives the pressed-key detection information from the key input unit and holds acceleration data on a point of time immediately before receiving the pressed-key detection information, adds an offset voltage level to the acceleration data according to the coordinate voltage level from the coordinate voltage level conversion unit and converts the acceleration data into an acceleration inverted voltage level in an inverse direction determined based on the offset voltage level;

an input voltage level correction unit that converts the input voltage level received from the input voltage level conversion unit into a corrected input voltage level according to the acceleration inverted voltage level from the first acceleration inverted voltage level conversion unit;

a corrected movement amount conversion unit that subtracts an offset voltage level from the corrected input voltage level received from the input voltage level correction unit based on the reference voltage from the reference voltage output unit and converts the corrected input voltage level into corrected movement amount data;

a coordinate voltage level correction unit that converts the coordinate voltage level from the coordinate voltage level conversion unit into a corrected coordinate voltage level according to the acceleration inverted voltage level from the second acceleration inverted voltage level conversion unit; and a corrected pressed-key information conversion unit that converts the corrected coordinate voltage level from the coordinate voltage level correction unit into corrected pressed-key information.

* * * * *